May 22, 1923.

V. W. PAGE 1,456,460

FRONT WHEEL BRAKE

Filed Jan. 12, 1922

WITNESSES

INVENTOR
VICTOR W. PAGE
BY
ATTORNEYS

May 22, 1923.

V. W. PAGE 1,456,460

FRONT WHEEL BRAKE

Filed Jan. 12, 1922

WITNESSES

INVENTOR
Victor W. Page
BY
ATTORNEYS

Patented May 22, 1923.

1,456,460

UNITED STATES PATENT OFFICE.

VICTOR W. PAGÉ, OF KEW GARDENS, NEW YORK.

FRONT WHEEL BRAKE.

Application filed January 12, 1922. Serial No. 528,804.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Front Wheel Brake, of which the following is a full, clear, and exact description.

The present invention relates to new and useful improvements in brakes for vehicles and it pertains more particularly to a brake construction especially adapted for use in connection with the front wheels of the vehicle.

It is the primary object of the invention to provide a new and improved mechanism by means of which the brakes of the front wheels of the vehicle may be applied regardless of the angular position of the wheels relative to the body of the vehicle or the line of travel thereof.

It is a further object of the invention to construct a front wheel brake in such a manner that the same is adaptable to the conventional type of axle and front wheel mount.

Referring to the drawings—

Figure 1:
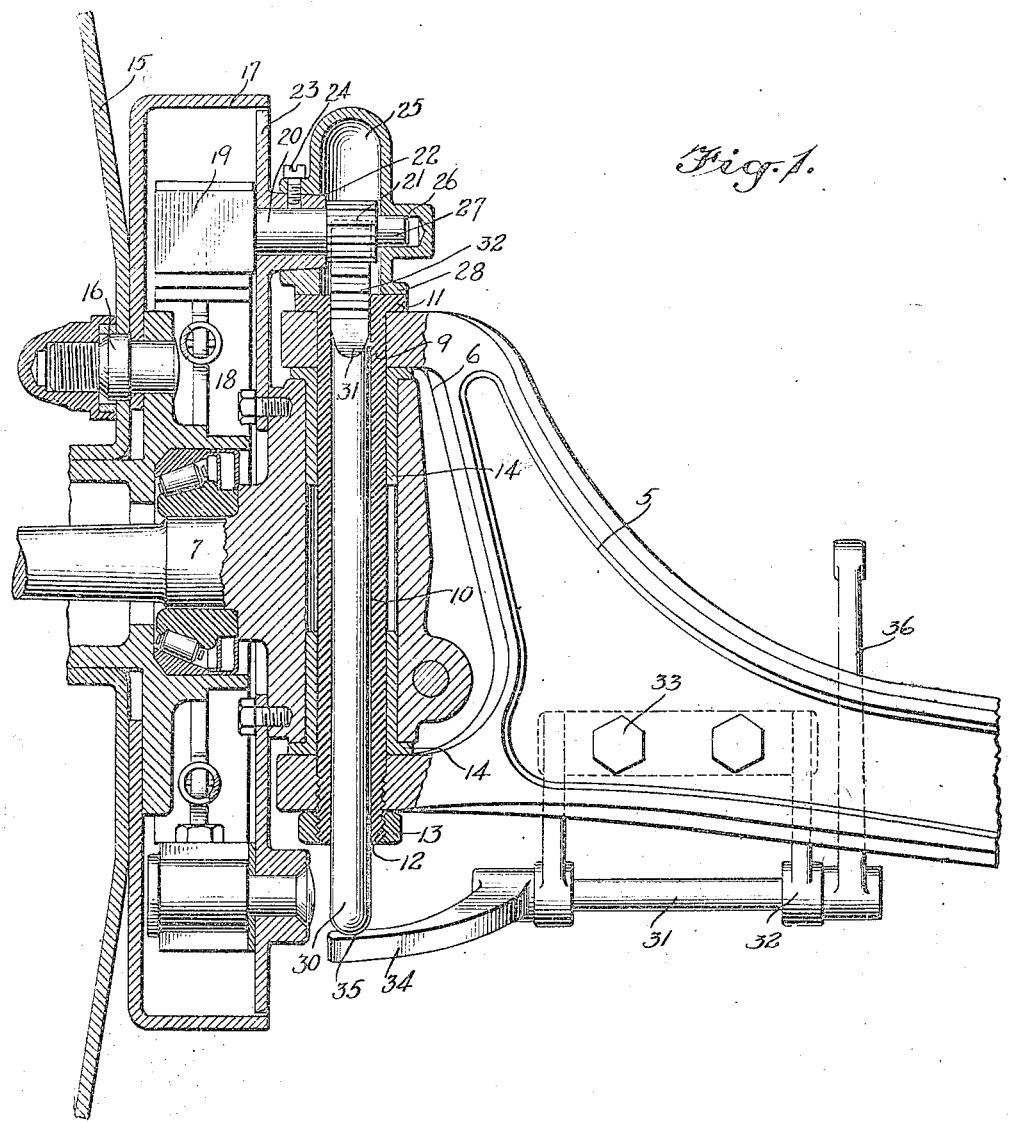
Figure 1 is a view of one end of the front axle of a vehicle showing a portion of the axle in elevation and a portion of the axle in section, the wheel mount and wheel together with the brake construction being shown in section.

Referring more particularly to the drawings, the reference character 5 designates the front axle of the vehicle, and 6 designates the yoke thereof. The steering spindle is indicated by the reference character 7, and is mounted within the yoke of the axle by means of a king bolt 9 or the like. In the present invention the king bolt 9 is hollow as indicated by the reference character 10, and is secured in position by being formed with a flange 11 on its upper end and screw-threaded as at 12 on its lower end to receive a nut 13. The steering knuckle is mounted on bushings 14 secured in the upper and lower ends of the steering knuckle, and said bushings 14 surround the king bolt as more clearly shown in Fig. 1.

The reference character 15 designates a wheel which is shown as of the disk type, and secured to said wheel 15 by means of bolts or the like 16, is a brake drum 17. Mounted internally of the brake drum 17 are brake shoes 18, shown in dotted lines in Fig. 2, and said brake shoes 18 are adapted to be expanded into contact with the inner peripheral surface of the brake drum 17 by means of a cam member 19. This cam member 19 is carried by a shaft 20, and mounted upon said shaft 20 is a pinion gear 21. The shaft 20 is mounted for movement in a tubular extension 22 of the closing plate 23 of the brake structure, and mounted upon the exterior of the tubular extension 22 and secured thereon by means of a set screw 24 or the like, is a housing 25. The housing 25 is formed with a hollow projection 26, within which the outer end 27 of the shaft 20 is mounted, and the housing is further provided with an enlarged base portion 28 adapted to rest upon the flange of the hollow king bolt 9.

Mounted for reciprocating movement within the hollow king bolt 9 is a rod 30 or the like, and said rod 30 has its upper end flattened as at 31, and provided with rack teeth as indicated by the reference character 32. The rack teeth are adapted to mesh with the teeth of the pinion gear 21 to rotate the same and also to rotate the shaft 20 and the cam member 19 to spread the brake shoes 18. To provide for reciprocating the member 30 within the hollow king bolt 9, a shaft 31 is mounted in brackets 32, which latter are secured to the front axle 5 by means of bolts 33 or the like. Mounted upon one end of the shaft 31 is a lever or arm 34, which engages the lower end of the member 30, as indicated at 35. Connected to the opposite end of the shaft 31, is an arm 36, which arm is connected to a suitable hand or foot lever (not shown) mounted within the driving compartment of the car in a position accessible to the operator thereof.

The device operates in the following manner:

As the arm or lever 36 is operated to rock the shaft 31, the arm 34 causes a reciprocation of the member 30 and owing to the rack 32 thereof engaging with the pinion gear 21, the shaft 20 will be rotated to operate the cam member 19 and spread the brake shoes 18 into operative engagement with the inner peripheral surface of the brake drum 17.

Figure 2:
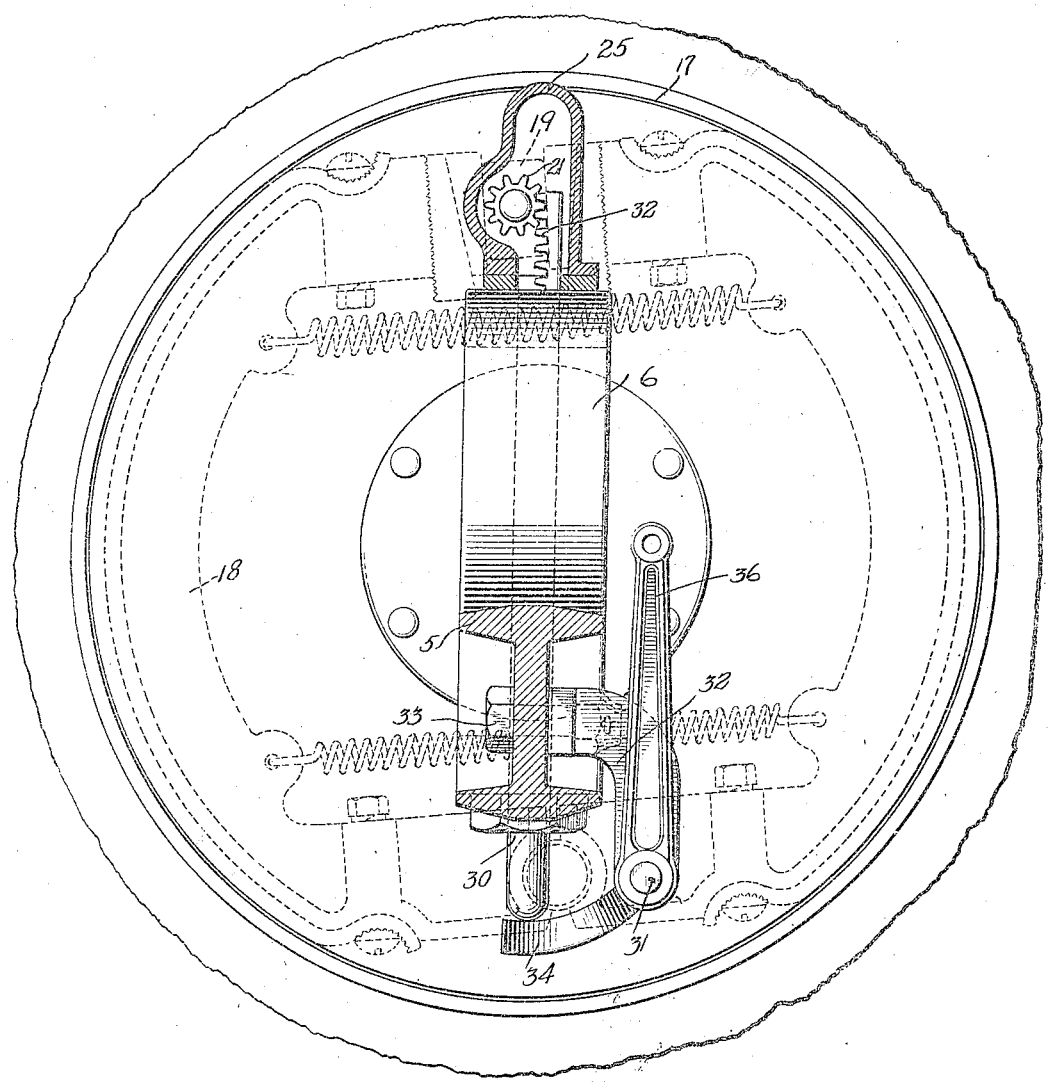
Fig. 2 is a view in elevation partly in section taken at right angles to Fig. 1.

The brake mechanism shown in dotted lines in Fig. 2 forms the subject matter of a co-pending application filed March 24, 1921, Serial No. 455,039, and therefore no claim is made thereto herein.

From the foregoing it is apparent that the present invention provides a new and improved mechanism for braking the steering wheels of a motor vehicle and that by the construction disclosed the brake of the front wheels may be applied regardless of their angular position relative to the body of the vehicle.

What is claimed is:

1. In a device of the character described, in combination with a wheel and its axle, a hollow king bolt for pivotally mounting the wheel in the axle, a brake carried by the wheel, and means for operating said brake comprising a cam, a shaft carried by said cam, a pinion gear mounted on said shaft, and means movable through said hollow king bolt for operating said pinion gear.

2. In combination with a steering wheel and its axle, a hollow king bolt for pivotally mounting said steering wheel, a brake carried by said steering wheel, means for operating said brake, said means comprising a cam, a shaft upon which said cam is mounted, a pinion gear carried by said shaft, a rack member movable through the hollow king bolt and having its rack portion engaging the pinion gear and means carried by the axle and adapted for engagement with said rack member to move the same longitudinally of the hollow king bolt to actuate the brake-operating means.

3. A device of the character described comprising in combination with an axle and a wheel pivotally mounted thereon, a hollow king bolt for pivotally mounting said wheel, an internal brake carried by said wheel, a cam for operating said internal brake, a shaft carrying said cam, a pinion gear mounted on said shaft, a rack member extending through the hollow king bolt, and a rocking lever pivotally mounted on the axle and adapted to engage said rack member to move the same longitudinally of the hollow king bolt to operate the cam of the internal brake, as and for the purpose set forth.

VICTOR W. PAGÉ.